United States Patent
Colman et al.

(10) Patent No.: US 6,575,010 B2
(45) Date of Patent: Jun. 10, 2003

(54) METHOD AND SYSTEM FOR DETECTING AND CROSS-CHECKING FAULTY SENSORS IN LIQUID LEVEL INDICATORS AND CONTROLLERS

(75) Inventors: Mark A. Colman, Duluth, GA (US); Thomas E. Lee, Cupertino, CA (US)

(73) Assignee: Clark-Reliance Corporation, Strongsville, OH (US)

(*) Notice: Subject to any disclaimer, the term of this patent is extended or adjusted under 35 U.S.C. 154(b) by 0 days.

(21) Appl. No.: 09/997,317

(22) Filed: Nov. 29, 2001

(65) Prior Publication Data

US 2002/0134132 A1 Sep. 26, 2002

Related U.S. Application Data

(60) Provisional application No. 60/250,270, filed on Nov. 29, 2000.

(51) Int. Cl.[7] ............................................. G01F 25/00
(52) U.S. Cl. ........................ 73/1.73; 73/304 R; 702/59
(58) Field of Search ............................... 73/1.73, 1.83, 73/304 R, 304 C; 702/59, 100, 104, 55, 185, 183

(56) References Cited

U.S. PATENT DOCUMENTS

| | | | |
|---|---|---|---|
| 3,614,887 A | | 10/1971 | Douglass |
| 4,020,488 A | | 4/1977 | Martin et al. |
| 4,507,521 A | * | 3/1985 | Goellner .................... 174/151 |
| 4,872,120 A | * | 10/1989 | Orloff et al. ................ 364/509 |
| 5,146,785 A | * | 9/1992 | Riley ......................... 73/313 |
| 6,288,673 B1 | * | 9/2001 | Dolmeta et al. ............ 342/374 |
| 6,332,358 B1 | * | 12/2001 | Atkinson .................... 73/304 R |

FOREIGN PATENT DOCUMENTS

| | | |
|---|---|---|
| EP | 0629844 A1 | 12/1994 |
| GB | 1056032 | 1/1967 |
| GB | 1257737 | 12/1971 |
| GB | 1605145 | 2/1982 |
| GB | 2083225 A | 3/1982 |

* cited by examiner

Primary Examiner—Hezron Williams
Assistant Examiner—Charles Garber
(74) Attorney, Agent, or Firm—Calfee, Halter & Griswold LLP (57) ABSTRACT

The present invention provides a method and system for detecting and cross-checking faulty sensors in liquid level indicators and controllers. A liquid level indicator and controller in which one embodiment of the present invention operates includes a control unit for controlling the other components of the liquid level indicator and controller, sensors electrically connected to the control unit for sensing the level of a liquid in a vessel, and an indicating device electrically connected to the control unit for displaying the liquid level. The control unit includes a monitor and a fault detector. In operation, the liquid level indicator and controller has two (2) basic modes. The first mode is a monitor mode. In this mode, the liquid level indicator and controller, under the control of the monitor, senses the liquid level in the vessel using the sensors and displays the liquid level on the indicating device. The second mode is a fault detection mode. In this mode, the liquid level indicator and controller, under the control of the fault detector, detects and cross-checks faulty sensors. If a faulty sensor is detected, the liquid level indicator and controller determines the type of fault, i.e., whether the sensor is open or shorted.

12 Claims, 6 Drawing Sheets

Fig. 6

METHOD AND SYSTEM FOR DETECTING AND CROSS-CHECKING FAULTY SENSORS IN LIQUID LEVEL INDICATORS AND CONTROLLERS

CROSS-REFERENCE TO RELATED APPLICATIONS

This application claims priority from provisional Application No. 60/250,270 filed Nov. 29, 2000, the entire disclosure of which is incorporated herein by reference.

FIELD OF THE INVENTION

The present invention relates generally to liquid level indicators and controllers and, more particularly, to a method and system for detecting and cross-checking faulty sensors in liquid level indicators and controllers.

BACKGROUND OF THE INVENTION

Liquid level indicators and controllers monitor the level of liquids in vessels, such as drums and tanks. The liquid level indicators and controllers then display the liquid level on indicating devices. In steam generating applications, the liquid level indicators and controllers distinguish between liquid and steam and, in non-steam generating applications, the indicators and controllers distinguish between liquid and air. In addition to indicating the liquid level, the liquid level indicators and controllers can actuate alarms, valves, pumps, and/or other electric controls at preset liquid levels.

Given the environment in which liquid level indicators and controllers operate, it is important for these indicators and controllers to be reliable. If any component in the liquid level indicator and controller is faulty, the liquid level information may not be correct. If the liquid level indicator and controller indicates that the liquid level is higher than it actually is, the indicator and controller may actuate an alarm or control when it should not be actuated. Conversely, if the liquid level indicator and controller indicates that the liquid level is lower than it actually is, the indicator and controller may not actuate an alarm or control when it should be actuated. In either case, the consequences can be quite severe. Therefore, a need exists for detecting and cross-checking faulty components in liquid level indicators and controllers.

SUMMARY OF THE INVENTION

The present invention provides a method and system for detecting and cross-checking faulty sensors in liquid level indicators and controllers. A liquid level indicator and controller in which one embodiment of the present invention operates includes a control unit for controlling the other components of the liquid level indicator and controller, sensors electrically connected to the control unit for sensing the level of a liquid in a vessel, and an indicating device electrically connected to the control unit for displaying the liquid level.

The control unit includes a processor, primary storage, a signal generator, a signal detector, and relays. The processor is electrically connected to the primary storage, the signal generator, the signal detector, the relays, and the indicating device. The primary storage includes a monitor and a fault detector. In one embodiment of the present invention, the monitor and the fault detector are software programs stored in the primary storage. The monitor and the fault detector are executed by the processor to control the components of the liquid level indicator and controller. Both the signal generator and the signal detector are electrically connected to each of the sensors.

In operation, the liquid level indicator and controller has two (2) basic modes. The first mode is a monitor mode. In this mode, the liquid level indicator and controller, under the control of the monitor, senses the liquid level in the vessel using the sensors and displays the liquid level on the indicating device. The second mode is a fault detection mode. In this mode, the liquid level indicator and controller, under the control of the fault detector, detects and cross-checks faulty sensors. If a faulty sensor is detected, the liquid level indicator and controller determines the type of fault, i.e., whether the sensor is open or shorted.

DETAILED DESCRIPTION OF THE INVENTION

Figure 1:
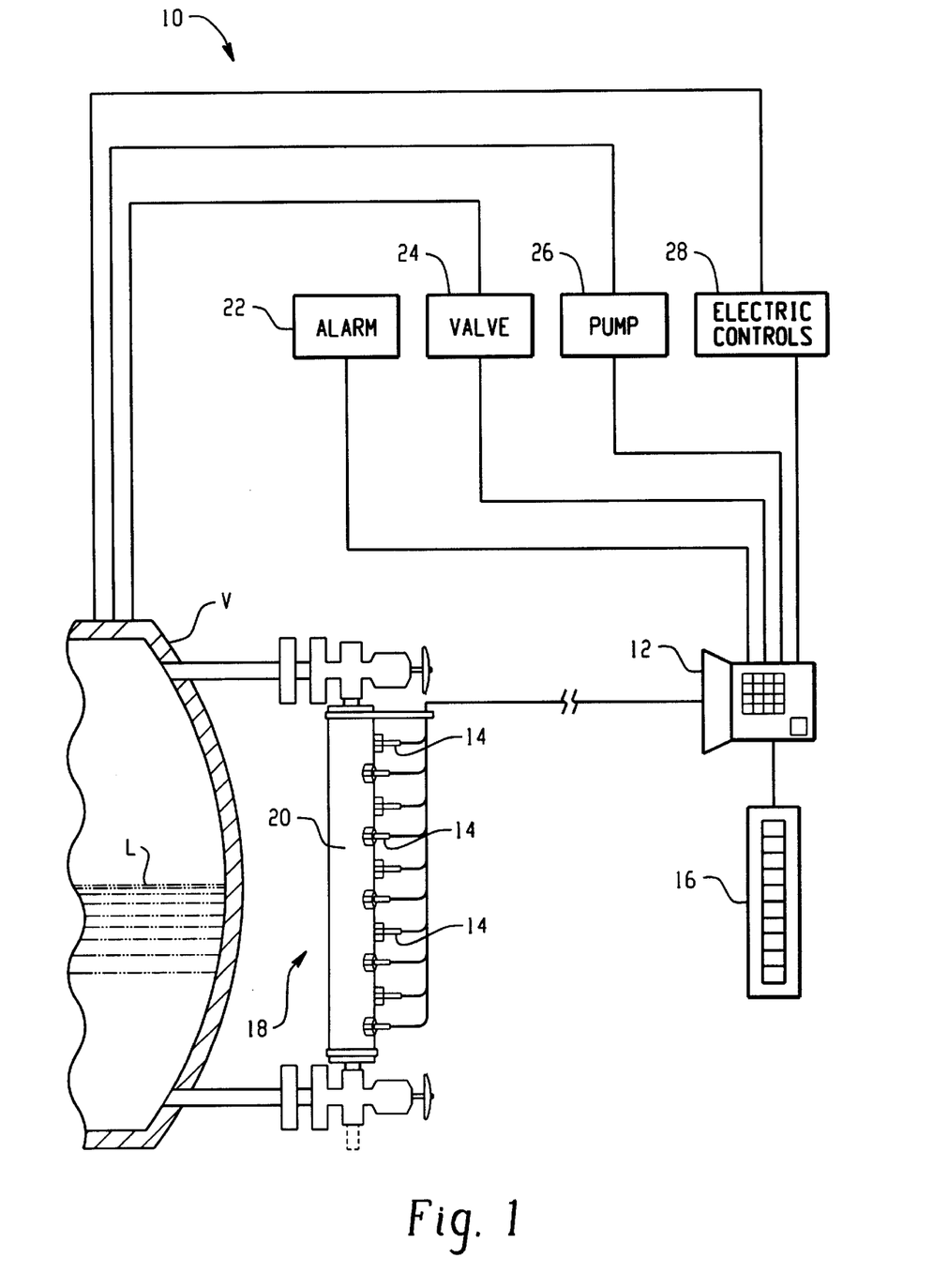
FIG. 1 is a schematic diagram illustrating the components of a liquid level indicator and controller in which one embodiment of the present invention operates.

The present invention provides a method and system for detecting and cross-checking faulty sensors in liquid level indicators and controllers. A liquid level indicator and controller 10 in which one embodiment of the present invention operates is illustrated in FIG. 1. The liquid level indicator and controller 10 includes a control unit 12 for controlling the other components of the liquid level indicator and controller 10, sensors 14 electrically connected to the control unit 12 for sensing the level of a liquid L in a vessel V, and an indicating device 16 electrically connected to the control unit 12 for displaying the liquid level. The liquid level indicator and controller 10 also includes a stand-off column 18 that is attached to the vessel V by valves and is electrically connected to the control unit 12. The stand-off column 18 contains the same liquid level as the vessel V. As the liquid level rises and falls in the vessel V, the liquid level correspondingly rises and falls in the stand-off column 18. The sensors 14 are mounted in a wall 20 of the stand-off column 18. If the stand-off column 18 was not used, the sensors 14 would be mounted directly in a wall of the vessel V. The liquid level indicator and controller 10 may also include an alarm 22, a valve 24, a pump 26, and other electric controls 28 electrically connected to the control unit 12 and, if necessary, connected to the vessel V for taking appropriate action if the liquid level reaches a preset level.

Figure 2:
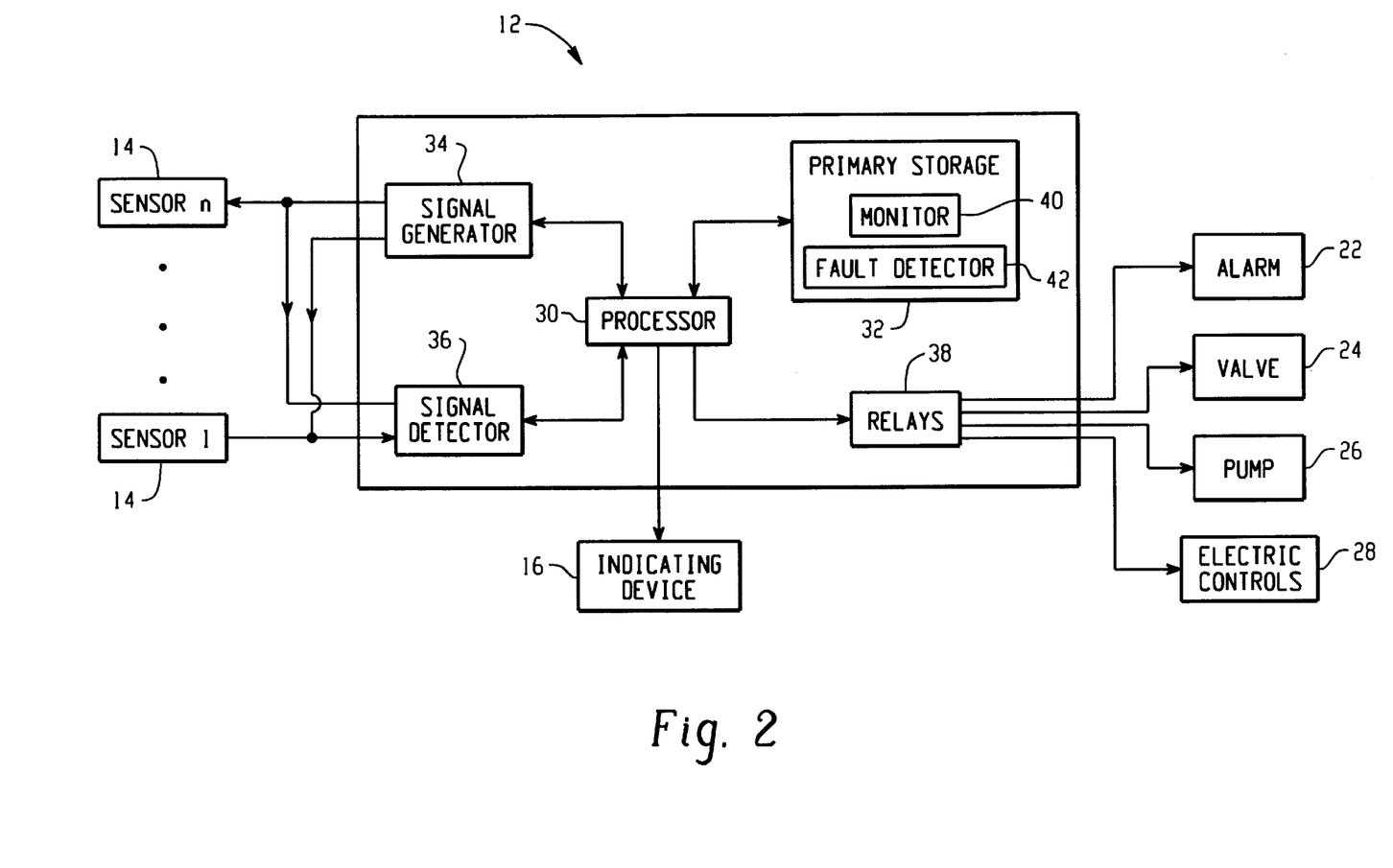
FIG. 2 is a block diagram illustrating the components of a control unit in the liquid level indicator and controller of FIG. 1 and their connection to the other components of the liquid level indicator and controller.

The components of the control unit 12 and their connection to the other components of the liquid level indicator and controller 10 are shown in FIG. 2. The control unit 12 includes a processor 30, primary storage 32, a signal generator 34, a signal detector 36, and relays 38. The processor 30 is electrically connected to the primary storage 32, the signal generator 34, the signal detector 36, the relays 38, and the indicating device 16. The primary storage 32 includes a monitor 40 and a fault detector 42. In one embodiment of the present invention, the monitor 40 and the fault detector 42 are software programs stored in the primary storage 32. The monitor 40 and the fault detector 42 are executed by the processor 30 to control the components of the liquid level indicator and controller 10. Both the signal generator 34 and the signal detector 36 are electrically connected to each of the sensors 14. In one embodiment of the present invention, the signal generator 34 and the signal detector 36 are combined in a single module. However, for ease of reference and explanation, the signal generator 34 and the signal detector 36 are shown and described as separate modules. The relays 38 are electrically connected to the alarm 22, the valve 24, the pump 26, and the other electric controls 28. The control unit 12 typically also includes secondary storage and includes or is electrically connected to any number of input/output devices, such as a display, a keyboard, and a printer (not separately shown). These additional components are well-known in the art and will not be described in greater detail.

Figure 3:
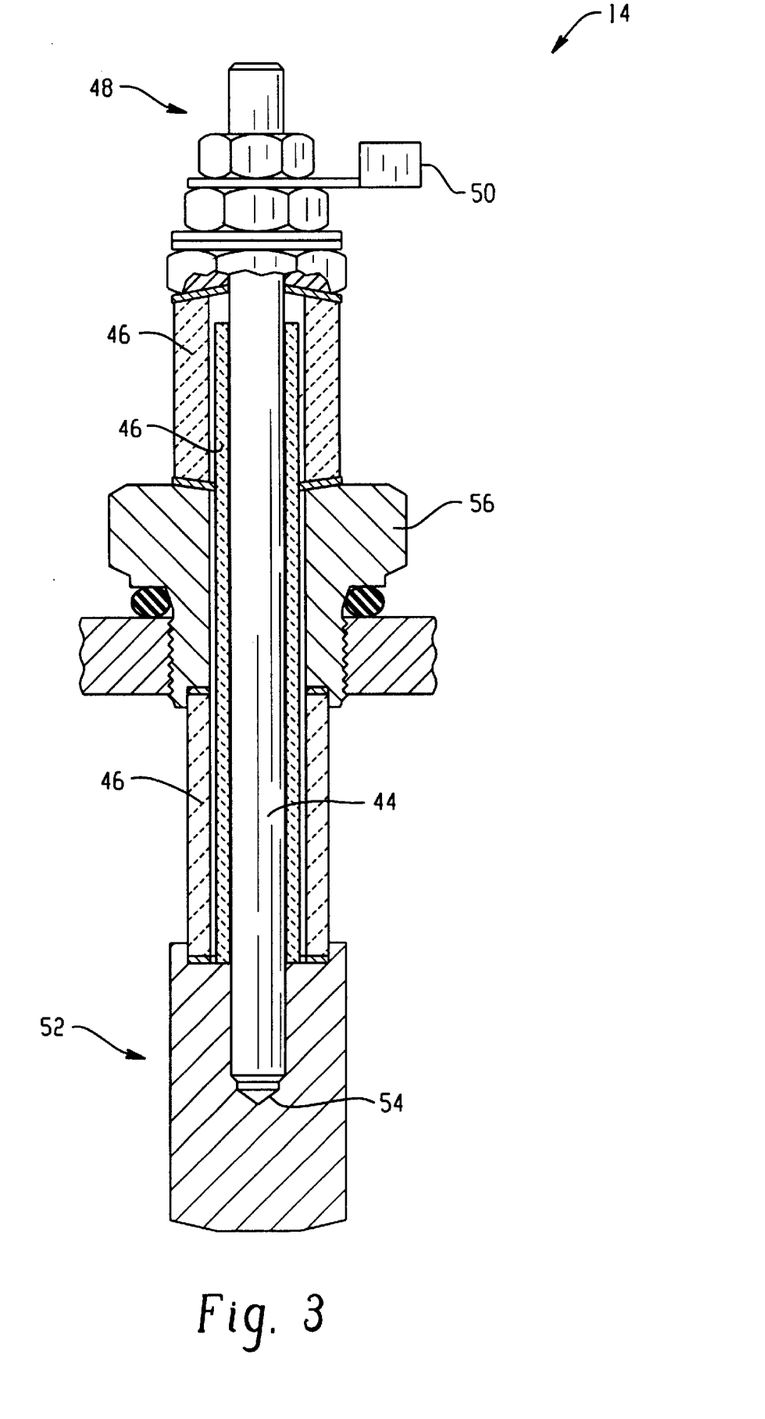
FIG. 3 is a schematic diagram illustrating the components of a sensor that could be used in the liquid level indicator and controller of FIG. 1.

One type of sensor 14 that could be used in the present invention is an electrical conductivity probe. U.S. Pat. No. 4,507,521, incorporated herein by reference, describes such an electrical conductivity probe. The basic components of a probe of this type are shown in FIG. 3. The probe 14 has a center rod 44 that is surrounded by insulation 46. A first end 48 of the center rod 44 is connected to a wiring terminal 50 that enables the center rod 44 to be electrically connected to the control unit 12. A second end 52 of the center rod 44 is connected to an electrode 54. A mounting body 56 is connected to the center rod 44 intermediate the wiring terminal 50 and the electrode 54 and enables the probe 14 to be mounted in the wall 20 of the stand-off column 18. The stand-off column 18 is electrically connected to the control unit 12 at ground potential.

A vertical series of probes 14 are mounted in the wall 20 of the stand-off column 18. Any number of sensors 14 could be used depending on the desired number of liquid levels to be monitored. As the liquid L in the vessel V rises, the liquid L in the stand-off column 18 correspondingly rises and the liquid L contacts the electrodes 54 of the sensors 14 that are at or below the liquid level. The liquid L also contacts the wall 20 of the stand-off column 18. When an electrode 54 is in contact with a gas, such as steam, a high resistance between the wall 20 of the stand-off column 18 and the electrode 54 is encountered. When an electrode 54 is in contact with a liquid, such as water, a relatively low resistance between the wall 20 of the stand-off column 18 and the electrode 54 is encountered. As a result, when the liquid L contacts the electrode 54 of one of the sensors 14 and the wall 20 of the stand-off column 18, an electrical circuit is completed.

In operation, the liquid level indicator and controller 10 has two (2) basic modes. The first mode is a monitor mode. In this mode, the liquid level indicator and controller 10, under the control of the monitor 40, senses the liquid level in the stand-off column 18 using the sensors 14 and displays the liquid level on the indicating device 16 (refer back to FIGS. 1 and 2). If the liquid level reaches a preset level, the liquid level indicator and controller 10 may actuate an alarm 22, a valve 24, a pump 26, or other electric controls 28 using the relays 38 in the control unit 12. The second mode is a fault detection mode. In this mode, the liquid level indicator and controller 10, under the control of the fault detector 42, detects and cross-checks faulty sensors 14. If a faulty sensor 14 is -detected, the liquid level indicator and controller 10 determines the type of fault, i.e., whether the sensor 14 is open or shorted.

Figure 4:
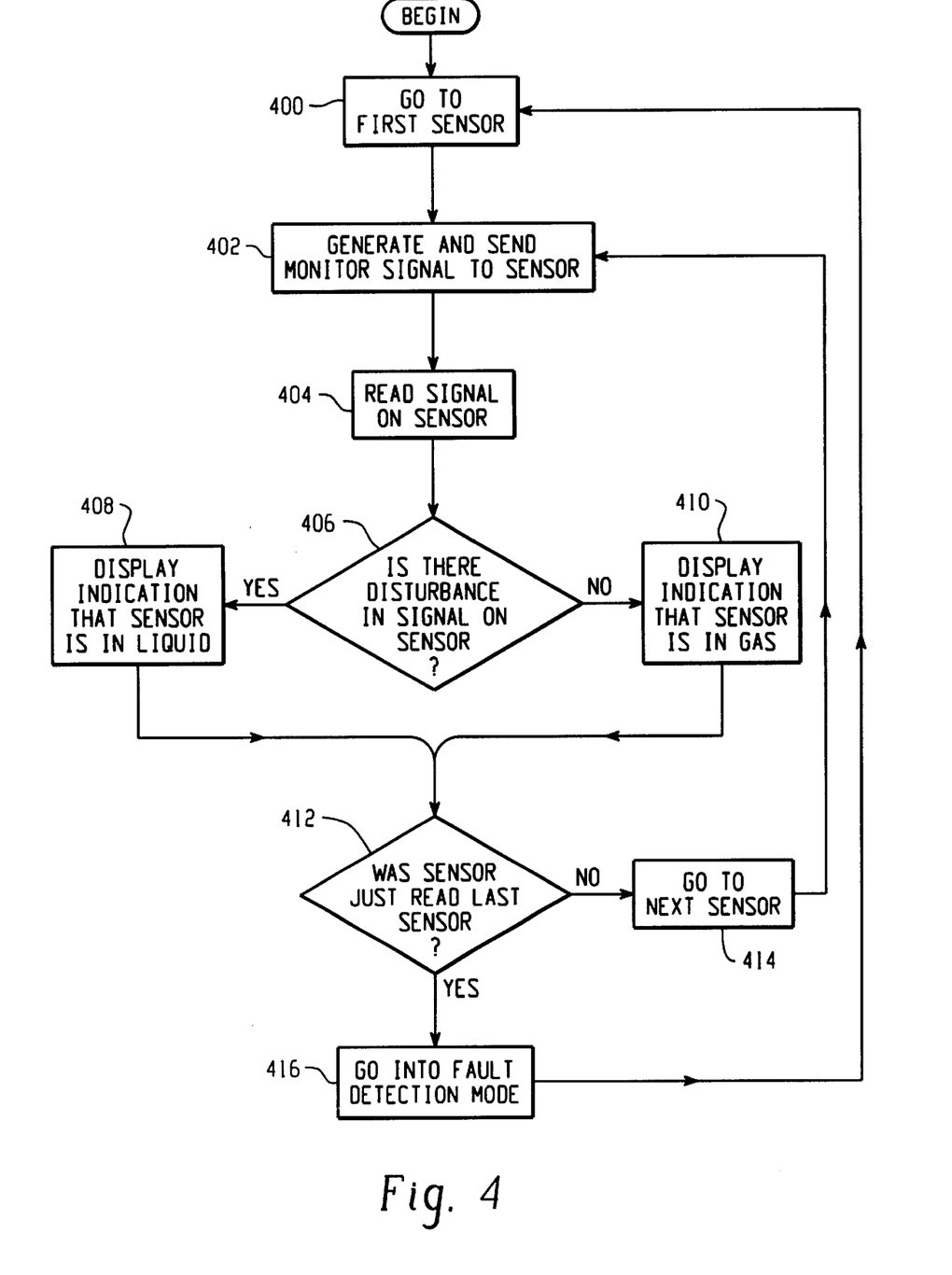
FIG. 4 is a flowchart generally illustrating the steps performed in the operation of the liquid level indicator and controller of FIG. 1 in a monitor mode.

FIG. 4 generally illustrates the steps performed by the liquid level indicator and controller 10 in the monitor mode. Starting with the first sensor 14 (step 400), the signal generator 34 generates and sends a monitor signal to the sensor 14 (step 402). In one embodiment of the present invention, the monitor signal is a three volt (3V) continuous (DC) signal. The signal detector 36 then reads the signal on the sensor 14 (step 404). The processor 30 determines whether there is a disturbance in the signal on the sensor 14 (step 406). If there is a disturbance in the signal (e.g., a voltage drop), the sensor 14 is in liquid and the processor 30 displays an indication that the sensor 14 is in liquid on the indicating device 16 (step 408). If there is no disturbance in the signal (e.g., no voltage drop), the sensor 14 is in gas and the processor displays an indication that the sensor 14 is in gas on the indicating device 16 (step 410). After displaying the appropriate indication on the indicating device 16, the processor 30 determines whether the sensor 14 just read was the last sensor (step 412). If the sensor 14 just read was not the last sensor, the processor 30 goes to the next sensor 14 (step 414) and repeats the above steps. If the sensor 14 just read was the last sensor, the processor 30 goes into the fault detection mode (step 416). All of the steps in the monitor mode are continually repeated.

Figure 5:
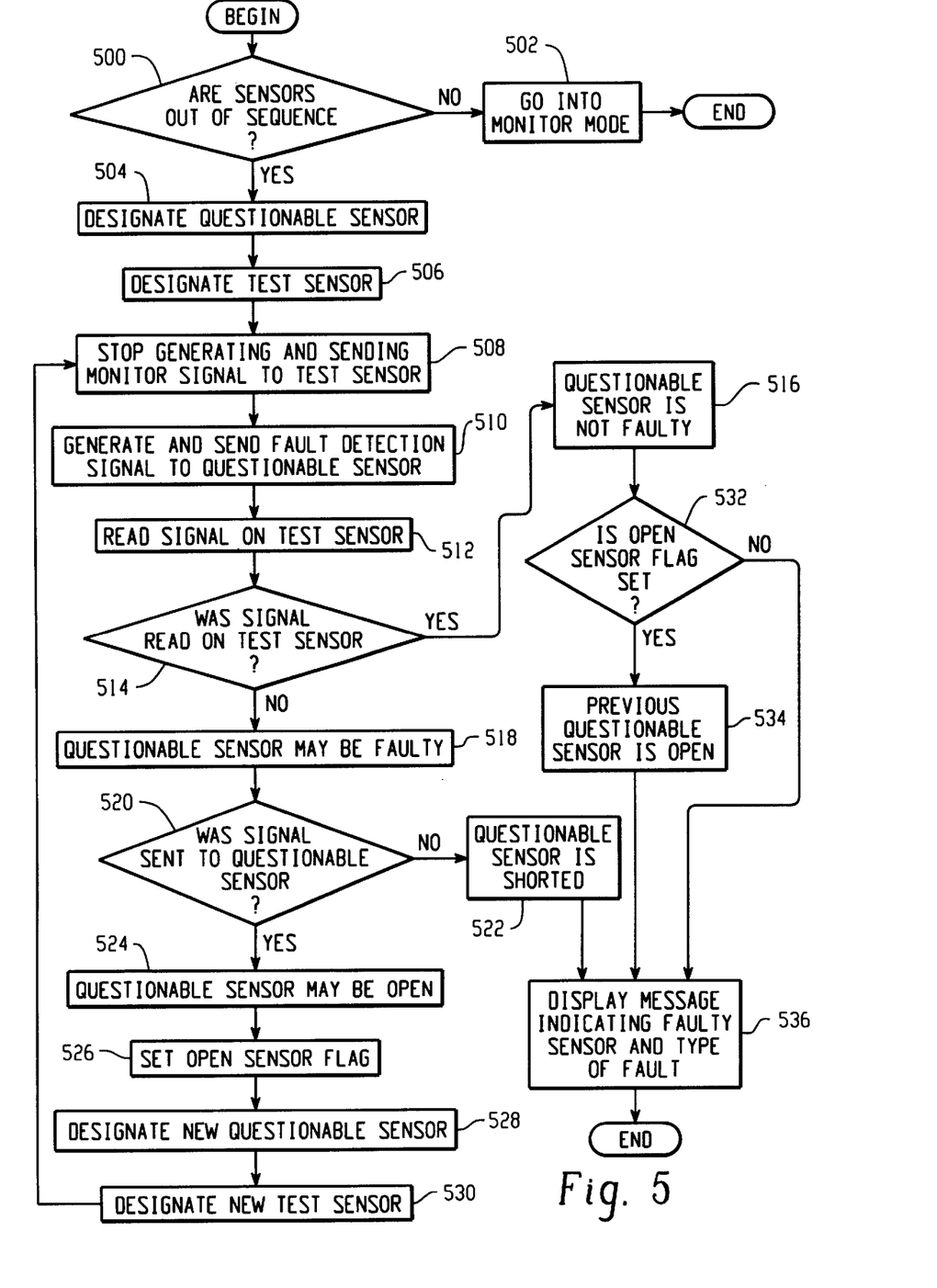
FIG. 5 is a flowchart generally illustrating the steps performed in the operation of the liquid level indicator and controller of FIG. 1 in a fault detection mode.

FIG. 5 generally illustrates the steps performed by the liquid level indicator and controller 10 in the fault detection mode. Initially, the processor 30 determines whether the sensors 14 are out of sequence (step 500). Specifically, the processor 30 determines whether the sensors 14 indicate that there is liquid above gas in the stand-off column 18. Gas is always above liquid in the stand-off column 18. Therefore, if the sensors 14 indicate that there is liquid above gas in the stand-off column 18, one of the sensors 14 must be faulty. If the sensors 14 are not out of sequence, the processor 30 goes back into the monitor mode (step 502). If the sensors are out of sequence, the processor 30 must determine which sensor is faulty and the type of fault. The processor 30 designates the sensor 14 indicating that there is gas below liquid in the stand-off column 18 as a questionable sensor 14 (step 504). The processor then designates the sensor 14 adjacent to and above the questionable sensor 14 as a test sensor 14 (step 506). The signal generator 34 stops generating and sending the monitor signal to the test sensor 14 (step 508). The signal generator 34 then generates and sends a fault detection signal to the questionable sensor 14 (step 510). In one embodiment of the present invention, the fault detection signal is a five volt (5V) digital pulsed signal. The signal detector 36 reads (or attempts to read) the signal on the test sensor 14 (step 512). The processor 30 determines whether the signal was read on the test sensor 14 (step 514). If the signal was read on the test sensor 14, the questionable sensor 14 is not faulty (step 516). If the signal was not read on the test sensor 14, the questionable sensor 14 may be faulty (step 518) and the processor 30 must continue cross-checking the sensors.

Next, the processor 30 determines whether the signal was sent to the questionable sensor 14 (step 520). If the signal was not sent to the questionable sensor 14, the questionable sensor 14 is shorted to ground (step 522). The sensor 14 would be shorted if there is a break in the insulation 46 of the sensor 14 or if some conductive material, such as rust, builds up or becomes lodged between the electrode 54 of the sensor 14 and the wall 20 of the stand-off column 18. If the signal was sent to the questionable sensor 14, the questionable sensor 14 may be open (step 524). The sensor 14 would be open if there is a break in the wire connecting the sensor 14 to the control unit 12 or a break in the center rod 44 of the sensor 14. If the questionable sensor 14 may be open, the processor 30 sets an open sensor flag (step 526), designates the original test sensor 14 as the new questionable sensor 14 (step 528), designates the sensor 14 adjacent to and above the original test sensor 14 as the new test sensor 14 (step 530), and then repeats the above steps for the new questionable sensor 14 and the new test sensor 14. These steps may have to be repeated for additional adjacent sensors 14 above the questionable sensor 14 in order to determine which sensor 14 is actually faulty. After determining that a questionable sensor 14 is not faulty (referring back to step 516), the processor 30 determines whether the open sensor flag is set (step 532). If the open sensor flag is set, the previous questionable sensor 14 is open (step 534). After determining which sensor 14 is faulty and the type of fault, the processor 30 displays a message indicating the faulty sensor 14 and the type of fault (step 536). This message could be displayed on a display (not shown) connected to the processor 30 or printed on a printer (not shown) connected to the processor 30. Although this description has assumed that only one of the sensors 14 is faulty, it is possible for more than one of the sensors 14 to be faulty. In this case, the processor 30 would repeat the process described above for adjacent sensors below the questionable sensor 14 until all of the faulty sensors and their types of faults were determined.

The following examples illustrate the steps that would be taken to detect and cross-check faulty sensors 14 in the liquid level indicator and controller 10 of the present invention. In these examples, there are six (6) sensors, S1 through S6, with S1 being the lowest sensor and S6 being the highest sensor. Also, in these examples, S1, S2, and S4 indicate that there is liquid at the level of these sensors, and S3, S5, and S6 indicate that there is gas at the level of these sensors. S3 and S4 indicate that there is liquid above gas in the stand-off column 18. Therefore, S3 and S4 may be faulty because liquid cannot be above gas in the stand-off column 18. Based on the method and system described above, S3 is designated as the questionable sensor and S4 is designated as the test sensor.

Figure 6:
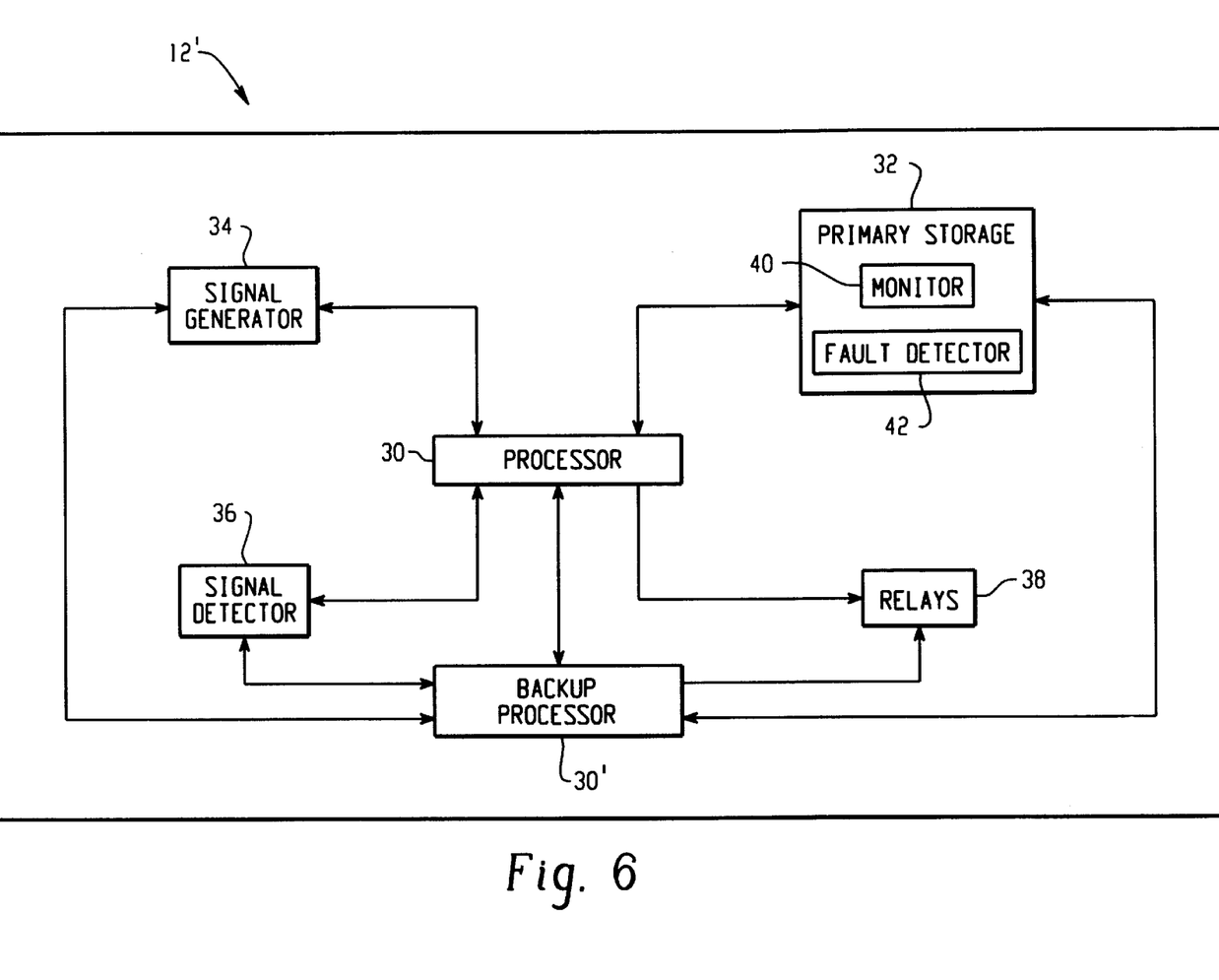
FIG. 6 is a block diagram illustrating the components of an alternative control unit.

1. If S3 is actually open, the following steps would be taken:
Send signal to S3
Attempt to read signal on S4
Signal was not read on S4
S3 may be faulty
Determine whether signal was sent to S3
Signal was sent to S3
S3 may be open
Send signal to S4
Attempt to read signal on S5
Signal was read on S5
S4 is not faulty
S3 is open 2. If S3 is actually shorted, the following steps would be taken:
Send signal to S3
Attempt to read signal on S4
Signal was not read on S4
S3 may be faulty
Determine whether signal was sent to S3
Signal was not sent to S3
S3 is shorted 3. If S4 is actually open, the following steps would be taken:
Send signal to S3
Attempt to read signal on S4
Signal was-not read on S4
S3 may be faulty
Determine whether signal was sent to S3
Signal was sent to S3
S3 may be open
Send signal to S4
Attempt to read signal on S5
Signal was not read on S5
S4 may be faulty
Determine whether signal was sent to S4
Signal was sent to S4
S4 may be open
Send signal to S5
Attempt to read signal on S6
Signal was read on S6
S5 is not faulty
S4 is open
Send signal to S2
Attempt to read signal on S3
Signal was read on S3
S3 is not faulty 4. If S4 is actually shorted, the following steps would be taken:
Send signal to S3
Attempt to read signal on S4
Signal was not read on S4
S3 may be faulty
Determine whether signal was sent to S3
Signal was sent to S3
S3 may be open
Send signal to S4
Attempt to read signal on S5
Signal was not read on S5
S4 may be faulty
Determine whether signal was sent to S4
Signal was not sent to S4
S4 is shorted
Send signal to S2
Attempt to read signal on S3
Signal was read on S3
S3 is not faulty The components of an alternative control unit 12' are shown in FIG. 6. The control unit 12' includes all of the components of the control unit 12 shown in FIG. 2. These components are shown in FIG. 6 with the same reference numbers as in FIG. 2. Additionally, the control unit 12' includes a backup processor 30'. The backup processor 30' is identical to the processor 30 and is electrically connected to the processor 30 and the other components of the control unit 12. However, the backup processor 30' has a different power source than the processor 30. Therefore, a problem with the power source for the processor 30 will not affect the backup processor 30'. During operation of the liquid level indicator and controller 10, the processor 30 and the backup processor 30' periodically send signals to each other. If the processor 30 fails and does not send a signal to the backup processor 30' within a preset period of time, the backup processor 30' takes over control of the liquid level indicator and controller 10 without any disruption in the operation thereof. This seamless takeover by the backup processor 30' ensures that the reliability of the liquid level indicator and controller 10 will not be compromised if the processor 30 fails.

One of ordinary skill in the art will now appreciate that the present invention provides a method and system for detecting and cross-checking faulty sensors in liquid level indicators and controllers. Although the present invention has been shown and described with reference to a particular embodiment, equivalent alteration and modifications will occur to those skilled in the art upon reading and understanding this specification. The present invention includes all such equivalent alterations and modifications and is limited only by the scope of the following claims in light of their full scope of equivalents.

What is claimed is:

1. A method for detecting and cross-checking faulty sensors in a liquid level indicator or controller, comprising the steps of:
    detecting a sensor that is out of sequence;
    designating a questionable sensor;
    designating a test sensor;
    sending a fault detection signal to the questionable sensor;
    reading the fault detection signal on the test sensor;
    determining whether the fault detection signal was read on the test sensor;
    if the fault detection signal was read on the test sensor, indicating that the questionable sensor is not faulty;
    if the fault detection signal was not read on the test sensor, determining whether the fault detection signal was sent to the questionable sensor;
    if the fault detection signal was not sent to the questionable sensor, indicating that the questionable sensor is shorted; and
    if the fault detection signal was sent to the questionable sensor, determining whether the questionable sensor is open.

2. The method of claim 1, wherein the step of determining whether the questionable sensor is open comprises the steps of:
    setting an open sensor flag;
    designating a new questionable sensor;
    designating a new test sensor;
    sending a fault detection signal to the new questionable sensor;
    reading the fault detection signal on the new test sensor;
    determining whether the fault detection signal was read on the new test sensor;
    if the fault detection signal was read on the new test sensor,
        indicating that the new questionable sensor is not faulty;
        determining whether the open sensor flag is set; and
        if the open sensor flag is set,
            indicating that the previous questionable sensor is open;
    if the fault detection signal was not read on the new test sensor, determining whether the fault detection signal was sent to the new questionable sensor;
    if the fault detection signal was not sent to the new questionable sensor, indicating that the new questionable sensor is shorted; and
    if the fault detection signal was sent to the new questionable sensor, determining whether the new questionable sensor is open.

3. The method of claim 2, further comprising the step of:
    repeating the step of determining whether the questionable sensor is open for each questionable sensor that may be open.

4. A fault detector for detecting and cross-checking faulty sensors in a liquid level indicator or controller, comprising:
    means for detecting a sensor that is out of sequence;
    means for designating a questionable sensor;
    means for designating a test sensor;
    means for determining whether a fault detection signal that was sent to the questionable sensor was read on the test sensor;
    if the fault detection signal was read on the questionable sensor, means for indicating that the questionable sensor is not faulty;
    if the fault detection signal was not read on the test sensor, means for determining whether the fault detection signal was sent to the questionable sensor;
    if the fault detection signal was not sent to the questionable sensor, means for indicating that the questionable sensor is shorted; and
    if the fault detection signal was sent to the questionable sensor, means for determining whether the questionable sensor is open.

5. The fault detector of claim 4, wherein the means for determining whether the questionable sensor is open further comprises:
    means for setting an open sensor flag;
    means for designating a new questionable sensor;
    means for designating a new test sensor;
    means for determining whether a fault detection signal that was sent to the new questionable sensor was read on the new test sensor;
    if the fault detection signal was read on the new test sensor,
        means for indicating that the new questionable sensor is not faulty;
        means for determining whether the open sensor flag is set; and
        if the open sensor flag is set,
            means for indicating that the previous questionable sensor is open;
    if the fault detection signal was not read on the new test sensor, means for determining whether the fault detection signal was sent to the new questionable sensor;
    if the fault detection signal was not sent to the new questionable sensor, means for indicating that the new questionable sensor is shorted; and
    if the fault detection signal was sent to the new questionable sensor, means for determining whether the new questionable sensor is open.

6. The fault detector of claim 5, further comprising:
    means for determining whether the questionable sensor is open for each questionable sensor that may be open.

7. A computer program product for detecting and cross-checking faulty sensors in a liquid level indicator or controller, comprising:
    computer readable program code configured to detect a sensor that is out of sequence;

computer readable program code configured to designate a questionable sensor;

computer readable program code configured to designate a test sensor;

computer readable program code configured to determine whether a fault detection signal that was sent to the questionable sensor was read on the test sensor;

if the fault detection signal was read on the test sensor, computer readable program code configured to indicate that the questionable sensor is not faulty;

if the fault detection signal was not read on the test sensor, computer readable program code configured to determine whether the fault detection signal was sent to the questionable sensor;

if the fault detection signal was not sent to the questionable sensor, computer readable program code configured to indicate that the questionable sensor is shorted;

if the fault detection signal was sent to the questionable sensor, computer readable program code configured to determine whether the questionable sensor is open; and a computer readable medium in which the computer readable program codes are stored.

8. The computer program product of claim 7, wherein the computer readable program code configured to determine whether the questionable sensor is open further comprises:

computer readable program code configured to set an open sensor flag;

computer readable program code configured to designate a new questionable sensor;

computer readable program code configured to designate a new test sensor;

computer readable program code configured to determine whether a fault detection signal that was sent to the new questionable sensor was read on the new test sensor;

if the fault detection signal was read on the new test sensor,
computer readable program code configured to indicate that the new questionable sensor is not faulty;
computer readable program code configured to determine whether the open sensor flag is set; and
if the open sensor flag is set,
computer readable program code configured to indicate that the previous questionable sensor is open;

if the fault detection signal was not read on the new test sensor, computer readable program code configured to determine whether the fault detection signal was sent to the new questionable sensor;

if the fault detection signal was not sent to the new questionable sensor, computer readable program code configured to indicate that the new questionable sensor is shorted; and if the fault detection signal was sent to the new questionable sensor, computer readable program code configured to determine whether the new questionable sensor is open.

9. The computer program product of claim 8, further comprising:

computer readable program code configured to determine whether the questionable sensor is open for each questionable sensor that may be open.

10. A control unit for detecting and cross-checking faulty sensors in a liquid level indicator or controller, comprising:

a processor configured to control the operation of the control unit;

primary storage connected to the processor;

a fault detector stored in the primary storage and executed by the processor, the fault detector being configured to:
detect a sensor that is out of sequence;
designate a questionable sensor; and
designate a test sensor;

a signal generator connected to the processor and being configured to send a fault detection signal to the questionable sensor;

a signal detector connected to the processor and being configured to read the fault detection signal on the test sensor; and the fault detector being further configured to,
determine whether the fault detection signal was read on the test sensor;
if the fault detection signal was read on the test sensor, indicate that the questionable sensor is not faulty;
if the fault detection signal was not read on the test sensor, determine whether the fault detection signal was sent to the questionable sensor;
if the fault detection signal was not sent to the questionable sensor, indicate that the questionable sensor is shorted; and
if the fault detection signal was sent to the questionable sensor, determine whether the questionable sensor is open.

11. The control unit of claim 10, wherein, if the questionable sensor may be open:

the fault detector being further configured to:
set an open sensor flag;
designate a new questionable sensor; and
designate a new test sensor;

the signal generator being further configured to send a fault detection signal to the new questionable sensor;

the signal detector being further configured to read the fault detection signal on the new test sensor; and the fault detector being further configured to:
determine whether the fault detection signal was read on the new test sensor;
if the fault detection signal was read on the new test sensor,
indicate that the new questionable sensor is not faulty;
determine whether the open sensor flag is set; and
if the open sensor flag is set,
indicate that the previous questionable sensor is open;
if the fault detection signal was not read on the test sensor, determine whether the fault detection signal was sent to the new questionable sensor;
if the fault detection signal was not sent to the new questionable sensor, indicate that the new questionable sensor is shorted; and
if the fault detection signal was sent to the new questionable sensor, determine whether the new questionable sensor is open.

12. The control unit of claim 11, wherein, if the questionable sensor may be open:

the fault detector, the signal generator, and the signal detector being further configured to determine whether the questionable sensor is open for each questionable sensor that may be open.

* * * * *